US006324036B1

(12) United States Patent
Dill, Jr. et al.

(10) Patent No.: US 6,324,036 B1
(45) Date of Patent: Nov. 27, 2001

(54) COMBINATION INDUCTIVE WRITE HEAD AND MAGNETORESISTIVE (MR) READ HEAD WITH IMPROVED TOPOGRAPHY

(75) Inventors: Frederick Hayes Dill, Jr., South Salem, NY (US); Robert E. Fontana, Jr.; Eric James Lee, both of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/320,480

(22) Filed: May 26, 1999

(51) Int. Cl.$^7$ .............................. G11B 5/147; G11B 5/33
(52) U.S. Cl. ......................................................... 360/320
(58) Field of Search ...................................... 360/317, 320, 360/125, 126, 322

(56) References Cited

U.S. PATENT DOCUMENTS

| | | | |
|---|---|---|---|
| 3,908,194 | 9/1975 | Romankiw | 360/317 |
| 4,423,451 | 12/1983 | Chi | 360/125 |
| 4,523,243 | 6/1985 | Billington | 360/327.24 |
| 5,272,582 | 12/1993 | Shibata et al. | 360/323 |
| 5,486,968 | 1/1996 | Lee et al. | 360/126 |
| 5,557,491 | 9/1996 | Gill et al. | 360/327.24 |
| 5,557,492 | 9/1996 | Gill et al. | 360/319 |
| 5,617,275 | 4/1997 | Ogura et al. | 360/317 |
| 5,691,867 | 11/1997 | Onuma et al. | 360/126 |
| 5,694,276 | * 12/1997 | Shen et al. | 360/317 |
| 5,742,459 | 4/1998 | Shen et al. | 360/327.32 |
| 5,761,013 | * 6/1998 | Lee et al. | 360/126 |

FOREIGN PATENT DOCUMENTS

| | | |
|---|---|---|
| 61-120318 | 6/1986 | (JP) . |
| 5-197920 | 8/1993 | (JP) . |
| 902-060 | 2/1982 | (SU) . |

OTHER PUBLICATIONS

"Buried Stud Planar Attach Head", *IBM Technical Disclosure Bulletin*, pp. 73–76, vol. 39, No. 10, Oct. 1996.

* cited by examiner

*Primary Examiner*—Robert S. Tupper
*Assistant Examiner*—Julie Anne Watko
(74) *Attorney, Agent, or Firm*—Gray Cary Ware & Freidenrich; Ervin F. Johnston

(57) ABSTRACT

An apparatus and method of making is disclosed for a combination read/write head having improved topography. The disclosed read/write head combines a magnetoresistive (MR) read head with an inductive magnetic write head. The head is planarized at a second shield layer with a planarization layer such that pads and leads connecting the pads to the MR sensor and coil are on a planar surface of the planaritzation layer. This planarization layer allows first and second shield layers to be optimized for the MR sensor to be used and also separates the pads and leads from the substrate. The combination head has first and second shield layers formed on a substrate, the shield layers being separated by a read gap. A magnetoresistive (MR) sensor and MR leads are located in the read gap. The planarization layer is then formed on the substrate, surrounding the first and second shield layers creating a planar surface that is coplanar with a top surface of the second shield layer. A write gap layer is fabricated along with a pole piece. The pole piece being separated by the write gap layer at the ABS and connected to the second shield layer at a back gap that is recessed in the head from the ABS. An insulation layer and coil layer embedded in the insulation layer with the insulation layer and the coil layer being located between the second shield layer and the pole piece. Pads and leads are formed on the planarization layer, with the leads electrically connected to the MR sensor and the coil.

109 Claims, 7 Drawing Sheets

COMBINATION INDUCTIVE WRITE HEAD AND MAGNETORESISTIVE (MR) READ HEAD WITH IMPROVED TOPOGRAPHY

BACKGROUND OF THE INVENTION

1. Field of the Invention

The present invention relates to an inductive write head combined with a magnetoresistive (MR) read head and, more particularly, to a combined head with improved topography in which pads and leads are planar, thereby eliminating shorts or opens in the structure due to steps.

2. Description of the Related Art

Typical mass storage devices store information on spinning magnetic disks, the information being recorded by transitions in magnetic flux on the magnetic surface of the disk. In particular, the data is recorded in a plurality of tracks, with each track being a selected radial distance from the center of the disk. A read/write head is positioned in close proximity to the disk surface and is held in place by an arm. Under control of the systems processor unit, the arm can move the read/write head to the appropriate track where data is recorded that it can be read or written.

A magnetic disk drive includes a magnetic head in a transducing relationship with a surface of the magnetic disk. When the disk is rotated, the magnetic head is supported on a thin cushion of air. The magnetic head may then be employed for writing information to multiple circular tracks on the surface of the disk, as well as for reading information therefrom. Processing circuitry exchanges signals, representing such information, with the head, provides motor drive signals for rotating the magnetic disk, and provides control signals for moving the head to various tracks. The magnetic head is comprises two components, an inductive write head and a read head.

An inductive write head includes a coil layer embedded in an insulation layer between first and second pole piece layers. A gap is formed between the first and second pole piece layers by a gap layer at an air bearing surface (ABS) of the write head. The pole piece layers are connected at a back gap. Current conducted through the coil layer produces a magnetic field in the pole pieces. The magnetic field fringes across the gap at the ABS for the purpose of writing the aforementioned data in tracks on the rotating disk or longitudinal tracks on a moving magnetic tape.

The second part of the head is the read portion. One type of head is the magnetoresistive (MR) head that utilizes direct magnetic flux sensing as a means of readback. The MR head includes a magnetoresistive sensor that detects magnetic field signals through resistance changes of a magnetoresistive material. In applying MR sensors to magnetic recording, many difficulties must be addressed including magnetic behaviors of the sensors that are appropriate for the recording environment and fabrication of the sensors.

For efficient read/write operations, the inductive write head should be placed in close proximity to the MR sensor. One type of read/write head is called a "piggy back" head, where the inductive head and the MR sensor positioned adjacent to each other. For closer placement of the components, a merged head is used. In the merged head, some components of the inductive head are shared with the MR head. Still another type of head places the MR read sensor at the center of the write gap between the pole tips. The problem with this design is intense magnetic field perturbations at every write cycle may aggravate instability problems of the MR sensor. Further, the pole tips are wide at the ABS in order to provide proper shielding for the MR sensor resulting in decreased track width density.

During fabrication of these heads, each of the layers is fabricated one on top of the next. The first device to be fabricated is the MR head and then the inductive head is fabricated. The MR head comprises a sensor located between first and second gap layers and the gap layers are located between first and second shield layers. To fabricate the MR head, the first shield layer is formed on a substrate with undercoat therebetween, the first gap layer is fabricated next, the MR sensor is next, next is the second gap layer and finally is the second shield layer. The inductive write head is then fabricated on top of the MR head. Fabrication of the inductive head includes a coil layer located between insulation layers with the insulation layers being between first and second pole piece layers. For the "piggy back" head, the first pole piece layer is formed on top of the second shield layer of the MR head. For a merged head, the second shield layer is the same as the first pole piece layer (performs a double function).

One disadvantage of the layered structures described above is the uneven or "stepped" topography resulting from the layering process. Most commonly, each of the layers differ in width, such that as the layers are formed on top of one another, steps form near the edges. As multiple layers are formed, multiple steps may be formed. These steps are a common area of failure causing shorts and opens for the lead layers that connect the MR sensor and coil contact points pads to the outer edge of the head. Another problem is if the diameter of the coil is greater than the previous layers, portions of the coil then are formed on multiple layers or steps, which could lead to shorts or opens in the coil itself.

It is desirable to provide a substantially even surface below the inductive coil. This is accomplished by adding material, such as an insulation layer or hard bake resist around the sides of a narrow layer to widen the layer under the coil area. A chemical mechanical polish (CMP) may then be done to eliminate the step and create a planar surface for the next layer. This solution introduces additional steps to the manufacturing process and makes excessive regions of hard bake resist.

Another method of planarization is to extend the layers under the coil to form planar surfaces for each subsequent layer. This makes layers that are unnecessarily large and not optimized. Extending the area of the pole pieces increases the risk of shorting between the lower pole piece and the shielding layer of the MR leads in the merged head. Additionally, extending the layers also extends the leads, which then increase lead resistance and the possibility of shorting between the leads and the shield layers. It is desirable to reduce the length and total area of the MR leads.

While prior art solutions, as indicated above, have described planar regions under the coil above the second shield layer (S2) of the MR head, the remainder of the head is not planarized. This creates shorts or opens in the leads that connect the pads at the outer edge to the MR sensor and coil contacts. Excessive topography for the leads can result in shorting paths around the outside edges of the hard baked regions. Additionally, these leads and pads are separated from the substrate only by the undercoat increasing the chance of capacitance coupling between the conducting undercoat layer and the leads and pads.

From the above it becomes apparent that the prior art combination inductive write head with MR read head results in devices that create pseudo planar surfaces with additional problems or do not provide planarization over the entire head structure. What is needed then is a combination read/write head that planarizes the head to eliminate shorts or opens due to underpass features, S1 shield or S2 shield. Ideally, the improved head should reduce the amount of hard baked resist and optimize the width of the shield layers.

SUMMARY OF THE INVENTION

The present invention discloses a merged magnetoresistive (MR) read head/inductive write head that improves the device topography by creating a planar surface such that the pads and leads are on the same plane. Additionally, the present invention discloses a head in which the shield layers may be optimized to be as small as possible while still shielding the MR sensor without concern for planarizing under the coil layer. To accomplish this, once the shield and sensor layers are formed, a planarizing layer of material is used, to not only planarize the area under the coil, but also to planarize the entire device surface, all the way out to the pads at the outer edge.

The unique design of the present invention offers many advantages over the prior art by virtually eliminating any shorts or opens of the leads due to steps. Other advantages of this design are that the separation between the leads and pads and substrate are substantially increased, thereby reducing the capacitance coupling between the conducting undercoat layer and the leads and pads. The first shield layer and the substrate may now be in direct contact (i.e., no undercoat alumina required). Reducing the size of the first shield layer also reduces the hard baked resist area, since the resist does not need to extend past the outer perimeter of the first shield layer, thus increasing the region where the pads can be safely positioned (i.e., the pads should not overlap any underlying hard baked resist).

The present magnetic merged MR head comprises a write head portion and a read head portion employing an MR sensor. The sensor is located between first and second gap layers and the gap layers are located between first and second shield layers. In a preferred embodiment, the first shield layer is essentially the same length as the second shield layer, which is shorter than the coil. In other embodiments, the second shield may be optimized to be shorter or longer depending on the minimum shielding requirements of the MR sensor used. To planarize the entire device at the second shield layer (the S2 layer), a planarizing layer is used. The planarizing layer extends the plane defined by the top surface of the second shield layer to create a structure in which the pads and the leads are coplanar.

The write head portion of the merged MR head includes an inductive coil positioned inside of an insulation layer. A portion of the coil along with insulation layer are located between first and second pole piece layers while the remainder of the coil is inside of insulation layer being formed on the planarizing layer. In a preferred embodiment, the first pole piece layer (P1) and the second shield layer (S2) are a common layer The first and second pole piece layers and are magnetically coupled at a back gap and separated by a write gap layer at the ABS.

The coil and MR sensor are connected with leads to pads formed on the planarizing layer. The pads connect to the coil and MR sensor with leads. The leads for the MR sensor are connected to the sensor with vias while the leads for the coil is connected to the inner and outer coil tap.

A method of manufacture is disclosed on the construction of the combination inductive write head and MR read head. The head is fabricated from numerous layers of material starting with a first shield layer (S1) that has been optimized for the sensor to be used is formed on a substrate. An insulation layer is next with upon which the sensor layer is placed comprising a MR or Giant MR (GMR) with sensor leads attached. An insulation layer is applied to cover the sensor and leads. The second shield layer (S2) /first pole piece layer (P1) is formed on the insulation layer. Because of the desire to planarize the head structure at a level with the top surface of the second shield layer, a planarization layer of material is applied to the substrate up to the top surface of the second shield layer. Chemical mechanical polishing (CMP) may be done make a smooth plane surface. The rest of the inductive head is now formed on the second shield layer/planarization layer including the coil embedded in insulation, the write gap layer and the second pole piece layer (P2). The pads are formed on the plane surface along with the leads connecting the pads to the coils and MR sensor.

The nature, objects, and advantages of the invention will become more apparent to those skilled in the art after considering the following detailed description in connection with the accompanying drawings.

DESCRIPTION OF THE PREFERRED EMBODIMENTS

Figure 1:
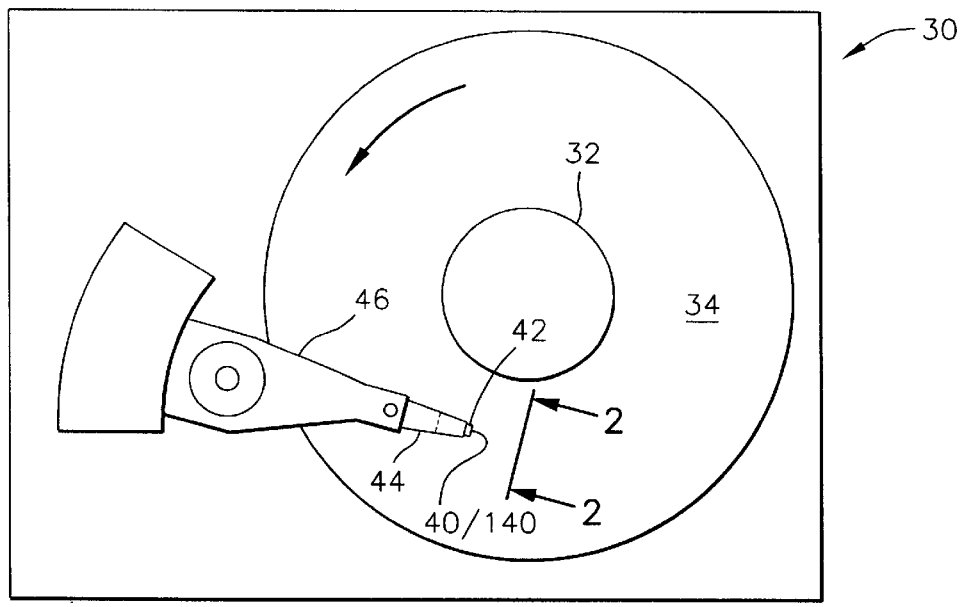
FIG. 1 is a planar view of an exemplary magnetic disk drive.
Figure 2:
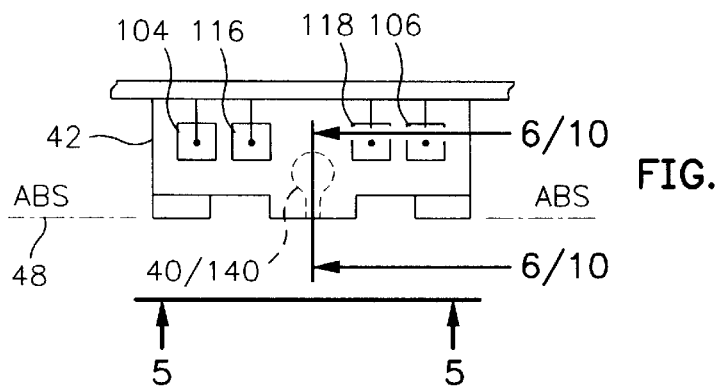
FIG. 2 is an end view of a slider with a magnetic head of the disk drive as seen in plane 2—2.
Figure 3:
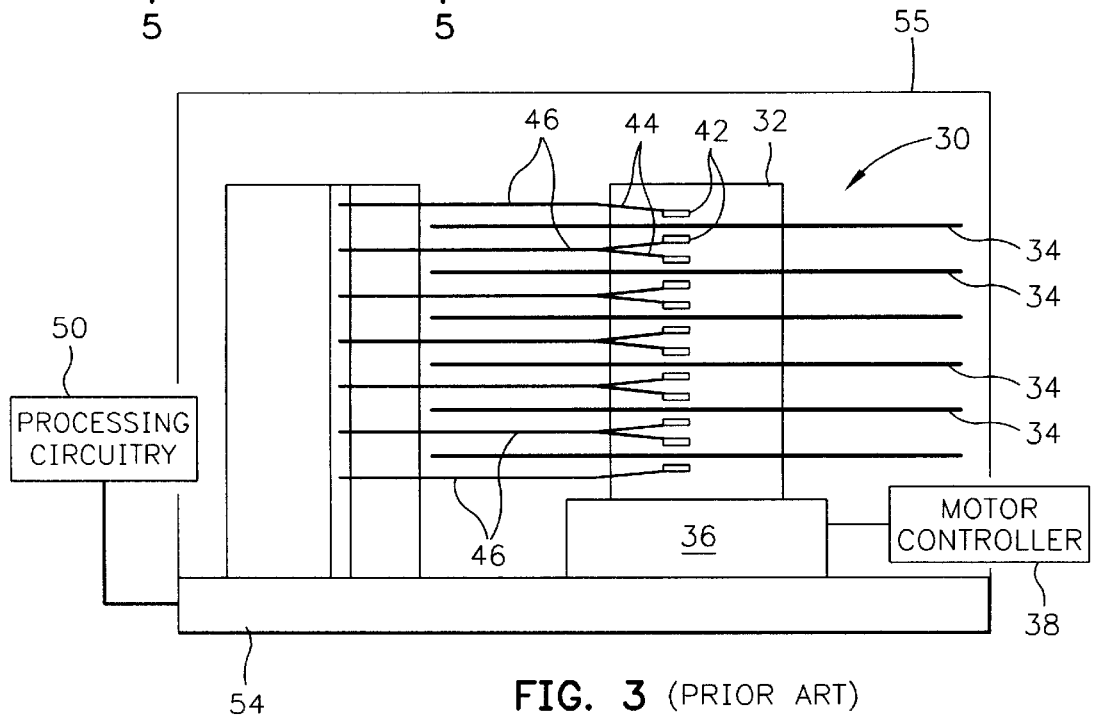
FIG. 3 is an elevation view of the magnetic disk drive wherein multiple disks and magnetic heads are employed.
Figure 4:
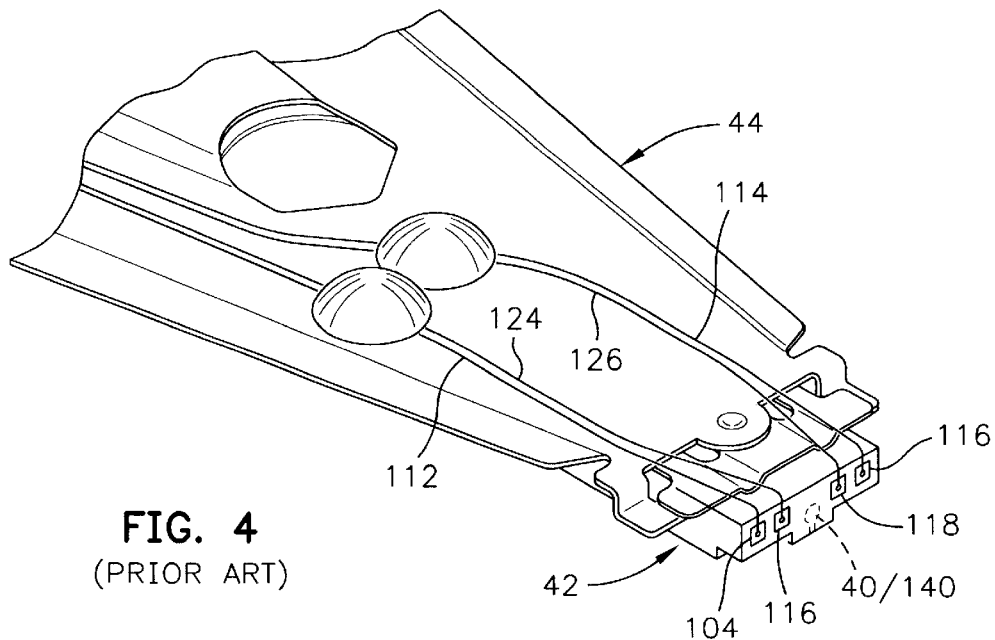
FIG. 4 is an isometric illustration of an exemplary suspension system for supporting the slider and magnetic head.

Referring now to the drawings wherein like reference numerals designate like or similar parts throughout the several views there is illustrated in FIGS. 1–3 a magnetic disk drive 30. The drive 30 includes a spindle 32 that supports and rotates a magnetic disk 34. The spindle 32 is rotated by a motor 36 that is controlled by a motor controller 38. A read/write magnetic head 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 µm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various tracks. In FIG. 4 the slider 42 is shown mounted to the suspension 44. The components described hereinabove may be mounted on a frame 54 of a housing 55, as shown in FIG. 3.

Figure 5:
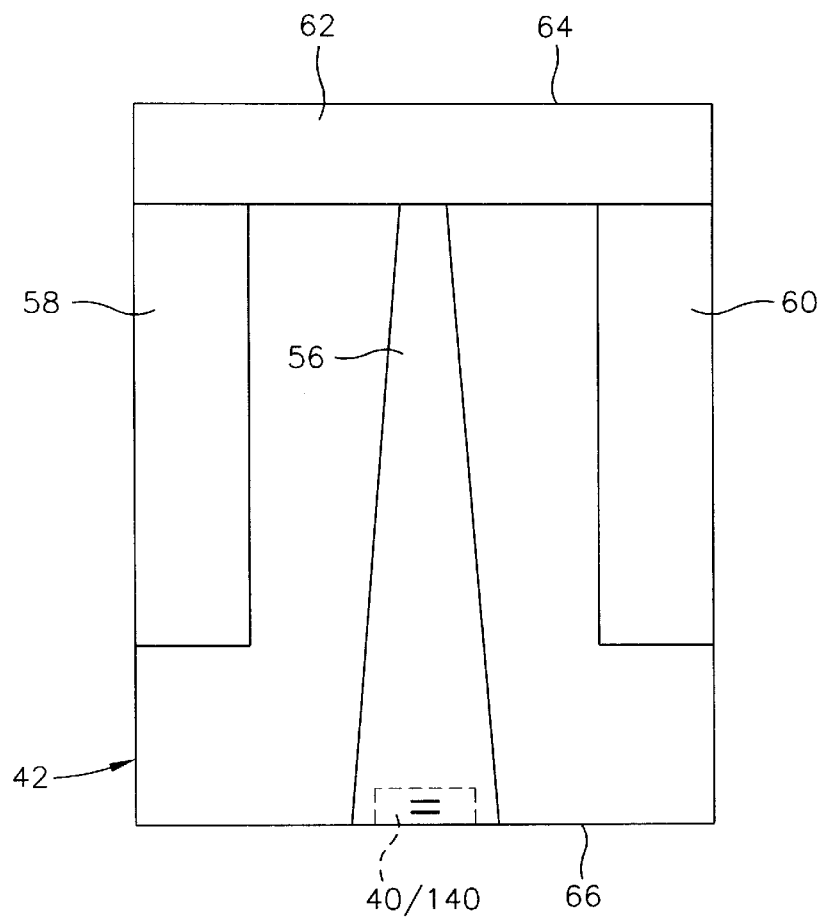
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Prior Art Merged MR Head

Figure 6:
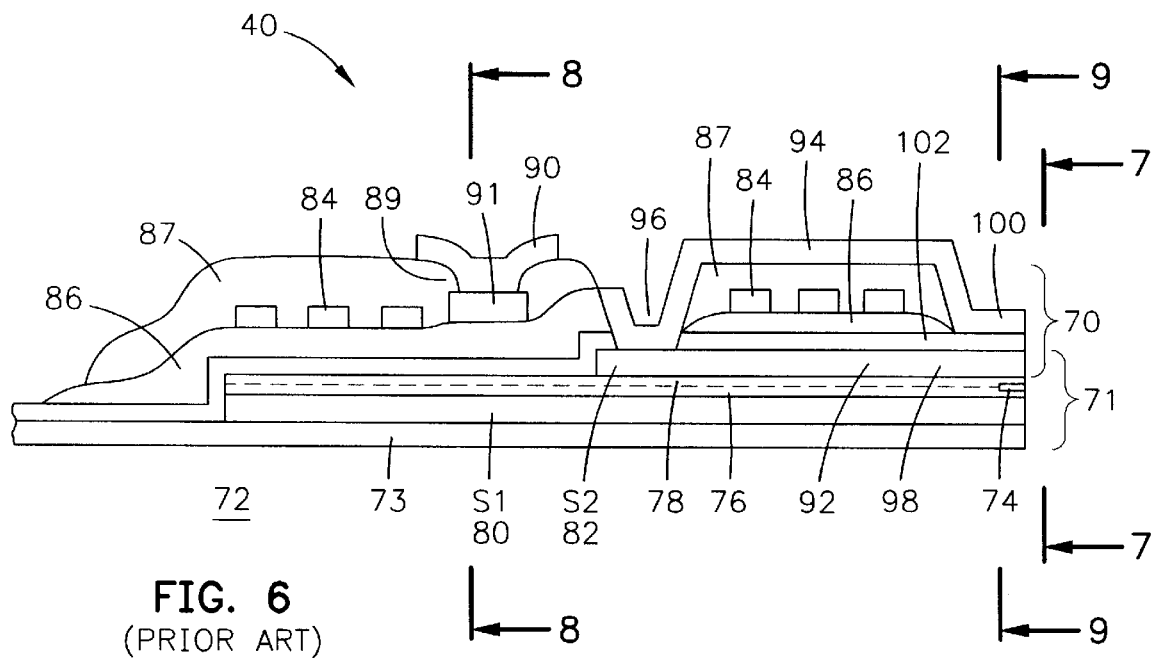
FIG. 6 is a partial cross-sectional view of the prior art magnetic head as seen in plane 6—6 of FIG. 2.
Figure 7:
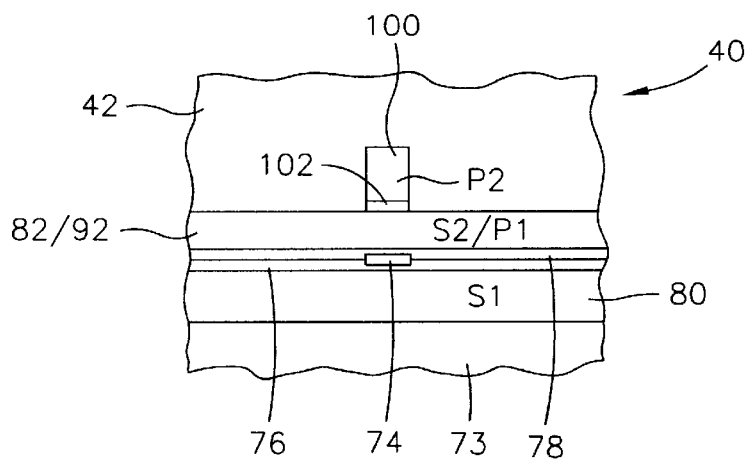
FIG. 7 is a enlarged partial ABS view of the slider taken along plane 7—7 of FIG. 6 to show the read and write elements of the prior art magnetic head.

FIG. 6 is a side cross-sectional elevation view of the merged magnetic head 40 which has a prior art write head portion 70 and a read head portion 71, the read head portion employing an MR sensor 74. FIG. 7 is ABS view of FIG. 6. The sensor 74 is located between first and second gap layers 76 and 78 and the gap layers are located between first and second shield layers 80 and 82. In response to external magnetic fields, the resistance of the sensor 74 changes. A sense current $I_S$ conducted through the sensor 74 causes these resistance changes to be manifested as potential changes. These potential changes are then processed as readback signals by the processing circuitry 50 shown in FIG. 3. The shielding layers 80 and 82 typically comprise a soft ferromagnetic material such as sendust or NiFe, and are formed by conventional methods such as chemical vapor deposition (CVD) or sputtering or plating. Shield layer 80 is formed on a substrate 72, being separated by a undercoat 73. The gap layers 76 and 78 comprise any material suitable for electrically isolating the conductive layers of the read head, e.g., $Al_2O_3$, $SiO_2$, etc.

The prior art write head portion 70 of the merged MR head includes an inductive coil layer 84 located in insulation layers 86 and 87. The coil layer 84 and insulation layers 86 are located between first and second pole piece layers 92 and 94. The first and second pole piece layers 92 and 94 are magnetically coupled at a back gap 96 and have first and second pole tips 98 and 100 which are separated by a write gap layer 102 at the ABS. An overpass conductor 90 provides electrical coupling between a write pad and the inner tap 91 of the inductive coil 84. The conductor 90 has access to the inner coil tap 91 through a via 89 in the insulation 87.

The coil 84 is provided with two electrical leads, at an inner tap 91 and at an outer tap (not shown). When a write current I in sent through the electrical leads and the coil 84, the current I produces a flux. The flux provides a substantial magnetomotive potential difference between first pole tip 98 and second pole tip 100 which provides an efficient write process.

As shown in FIGS. 2 and 4, first and second terminal pads 104 and 106 connect to leads 112 and 114 on the suspension 44 and third and fourth terminal pads 116 and 118 connect to leads 124 and 126 on the suspension. A wear layer 128 may be employed for protecting the sensitive elements of the magnetic head, as shown in FIGS. 2 and 4. It should be noted that the illustrated magnetic head 40 employs a single layer 82/92 to serve a double function as a second shield layer S2 for the read head and as a first pole piece PI for the write head. A piggyback MR head employs two separate layers for these functions.

Figure 8:
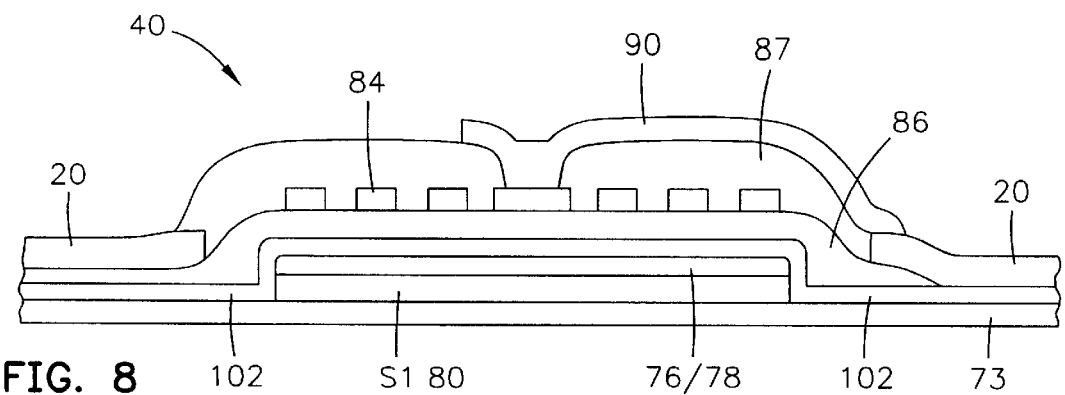
FIGS. 8 and 9 are views taken along plane 8—8 and 9—9 of FIG. 6 illustrating the prior art.
Figure 9:
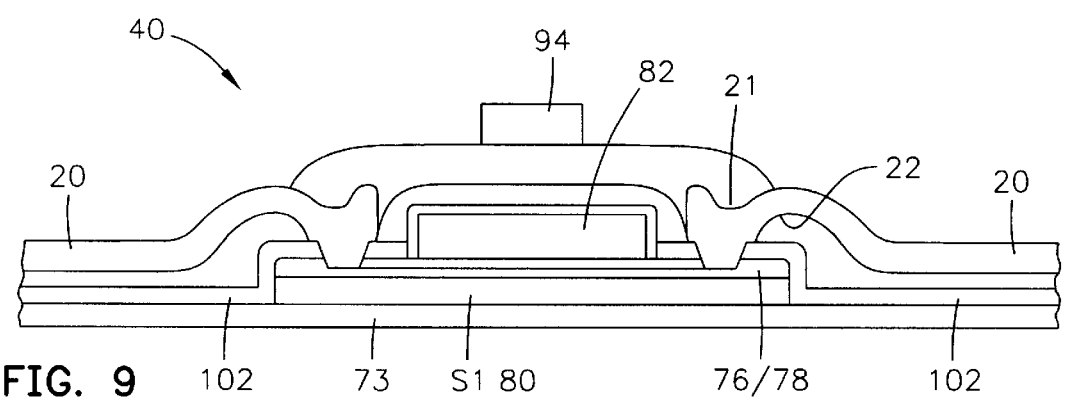

FIG. 7 shows an ABS view of the read/write head 40. FIGS. 8 and 9 show cross-sectional views of FIG. 6. As can be seen, the layers used in forming the head 40 form a bulge with steps near the outer edges. Attempts have been tried to planarize the head 40 above the second shield layer 82 (S2) level so that the layer for the coil 84 is relatively flat. Prior art heads accomplish this planarization by starting with an excessively large first shield layer 80. As the layers are fabricated, hard bake resist is used to provide build up for the pseudo planarization for the coil 84. As can be seen in the figure, this also creates steps for the leads 20 at the edge of the head 40 where the leads travel from the head 40 to the pads 21. This excessive topography for the leads 20 can result in shorting paths around the edges 22 of the hard bake regions and shields. Additionally, the leads and pads are separated from the substrate by only the undercoat 73.

The Invention

The merged read/write head 140 of the present invention improves the device topography by creating a planar structure such that the pads 121 and leads 120 are on the same plane. After the shield and sensor layers are formed, a planarizing layer of material is used, to not only planarize the area under the coil, but also planarize the entire device surface, all the way out to the pads at the outer edge. In this unique design, the leads connecting the MR sensor or coil and the pads are parallel to the substrate surface and on a plane defined by the top of the second shield layer S2 (i.e., all the pads and leads are coplanar). This virtually eliminates any shorts or opens of the leads due to steps. Some of the advantages of this design are that the separation between the pads and substrate are substantially increased, thereby reducing the capacitance coupling between the conducting undercoat layer and the pads. The first shield layer and the substrate may now be in direct contact (i.e., no undercoat alumina required). Reducing the size of the first shield layer thereby reduces the hard baked resist area, since the resist does not need to extend past the outer perimeter of the first shield layer, thus increasing the region where the pads can be safely positioned (i.e., the pads should not overlap any underlying hard baked resist).

Figure 10:
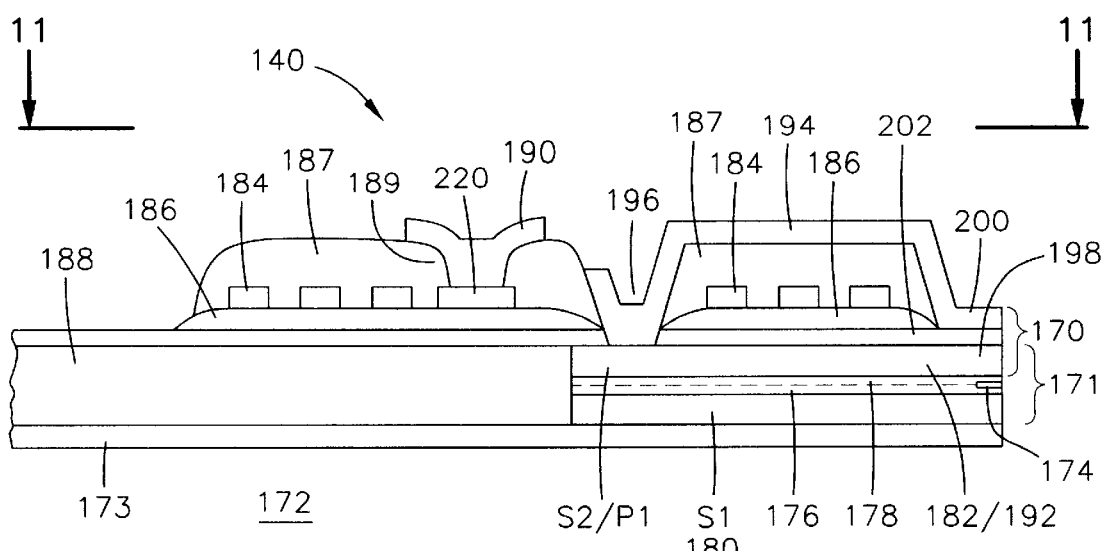
FIG. 10 is a partial cross-sectional view of the preferred embodiment magnetic head as seen in plane 10—10 of FIG. 2.
Figure 11:
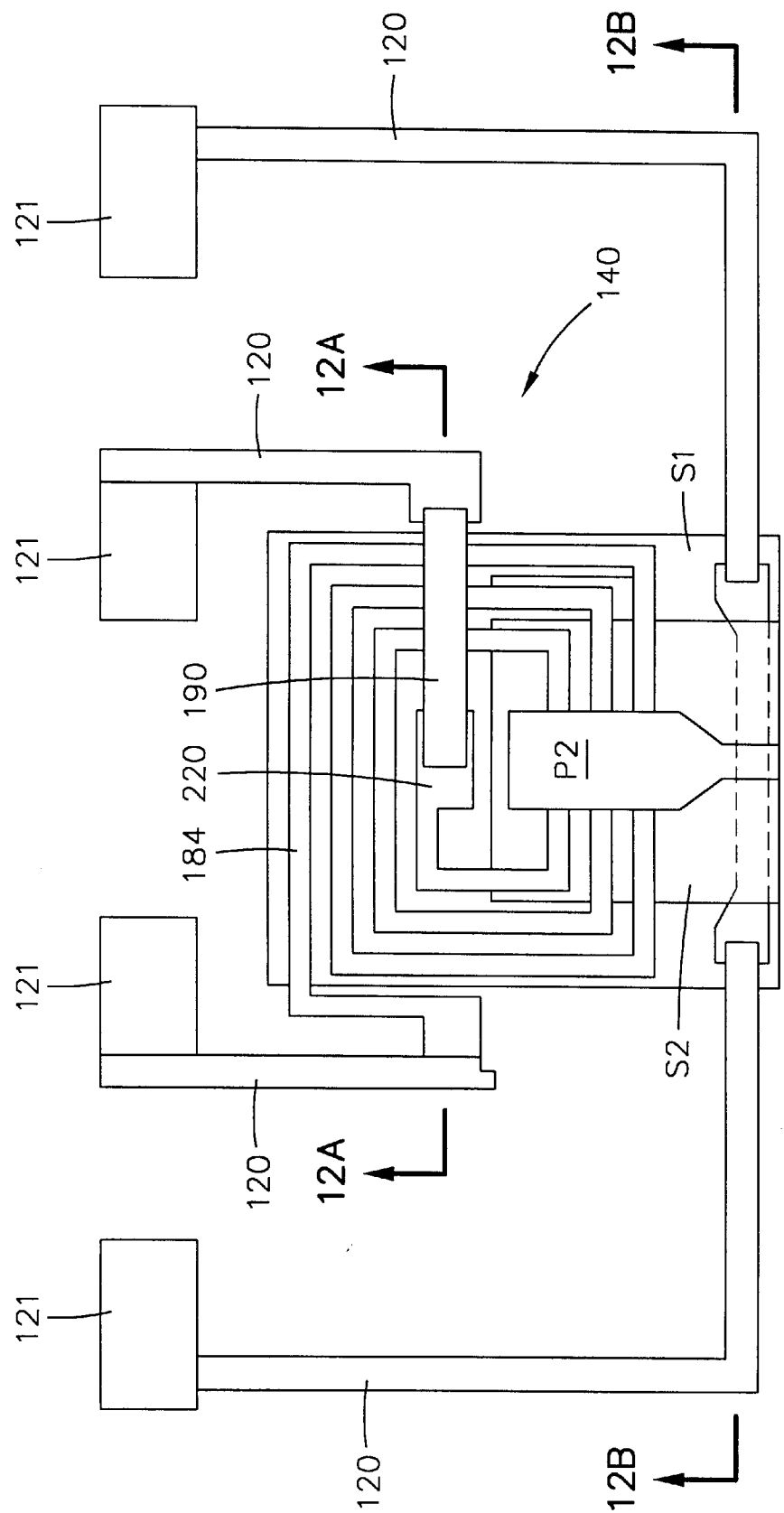
FIG. 11 is a view taken along plane 11—11-of FIG., 10 illustrating the present invention.
Figure 12A:
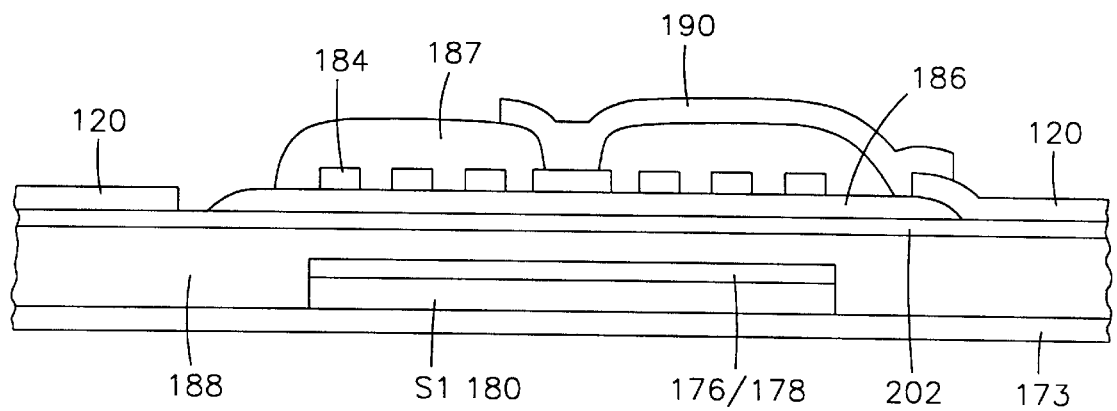
FIGS. 12A and 12B are views taken along plane 12A—12A and 12B—12B of FIG. 11 illustrating the present invention.
Figure 12B:
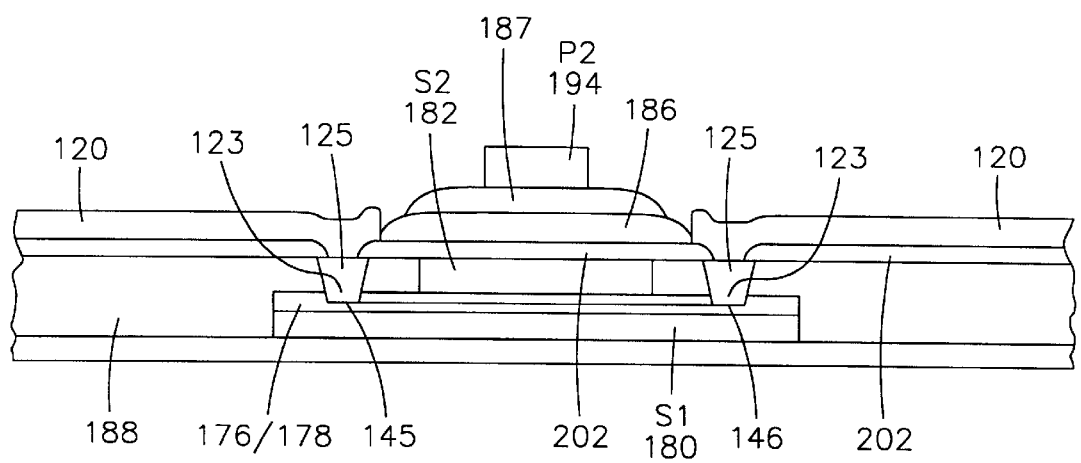

FIG. 10 is a side cross-sectional elevation view of the head 140 of the present invention which includes a write head portion 170 and a read head portion 171, the read head portion 171 employing an MR sensor 174. In response to external magnetic fields, the resistance of the MR sensor 174 changes. A sense current Is conducted through the MR sensor 174 causes these resistance changes to be manifested as potential changes. These potential changes are then processed as readback signals by the processing circuitry 50 shown in FIG. 3. FIG. 11 shows a planar view with portions of the upper layers removed for clarity. FIGS. 12A and 12B show cross-sectional views of FIG. 10. The sensor 174 is located between first and second gap layers 176 and 178 and the gap layers are located between first and second shield layers 180 and 182. In the embodiment shown in FIG. 11, the first shield layer 180 is essentially the same length as the second shield layer 182, which is shorter than coil 184. In still other embodiments, the shields 180 and 182 may be shorter or longer depending on the minimum shielding requirements of the MR sensor 174 used. To planarize the entire device at the second shield layer 182 (the S2 layer), a planarizing layer 188 is used. Planarizing layer 188 may be made of $Al_2O_3$. The shielding layers 180, 182 typically comprise a soft ferromagnetic material such as sendust or NiFe, and are formed by conventional methods such as chemical vapor deposition (CVD) or sputtering or plating. Shield layer 180 is formed on a substrate 172, and may be separated by an undercoat 173. The gap layers 176, 178 comprise any material suitable for electrically isolating the conductive layers of the read head, e.g., $SiO_2$, etc.

The write head portion 170 of the merged MR head 140 includes an inductive coil 184. The coil 184 is positioned inside of insulation layers 186 and 187. A portion of the coil 184 along with insulation layer 186 are located between first and second pole piece layers 192 and 194. The remainder of the coil is inside of insulation layers 186 and 187 being formed on the planarizing layer 188. The first and second pole piece layers 192 and 194 are magnetically coupled at a back gap 196 and have first and second pole tips 198 and 200 which are separated by a write gap layer 202 at the ABS. An overpass conductor 190 provides electrical coupling between a pad 121 and the inner tap 220 of the inductive coil 184. The conductor 190 has access to the inner coil tap 220 through a via 189 in the insulation 186. As shown in FIGS. 2 and 4, first and second terminal pads 104 and 106 connect to leads 112 and 114 on the suspension 44. Third and fourth terminal pads 116 and 118 connect to leads 124 and 126 on the suspension 44. Leads 120 and pads 121 are formed on the planar layer. The leads 120 are connected by vias 123 and copper studs 125 to the MR sensor leads 145 and 146. A wear layer (not shown) may be employed for protecting the sensitive elements of the magnetic head, as shown in FIGS. 2 and 4. It should be noted that the merged MR head 140 employs a single layer 182/192 to serve a double function as a second shield layer S2 for the read head and as a first pole piece P1 for the write head. A piggyback MR head employs two separate layers for these functions.

Method of Making

The various layers of the method of making are formed by sputter deposition or plating. Generally, the metallic layers are formed by plating and the non-conductive layers are formed by sputter deposition or forming hard baked photoresist. Sputter deposition is implemented in a vacuum chamber wherein a target of desired material is sputtered to a substrate via a plasma in the chamber because of an applied potential between the target and the substrate. Plating is a wet process wherein the wafer is placed in an electrolyte and a potential is applied between the surface to be plated and a plating material. Metallic ions from the plating material are then deposited on the desired surface. Masking is accomplished by photoresist masks which are spun onto the wafer, imaged with light and then portions to be removed are removed by a developer. Positive photoresist may be employed wherein the area of light imaging is removed by a developer to provide an opening for plating or a negative photoresist (cross-linked photoresist) may be employed where an area not imaged by light is removed by the developer to provide an opening for plating. After the desired layer is deposited the photoresist mask is then stripped by a dissolvent. Layer portions are removed by ion milling which, in essence, is particle bombardment of the layer with ions. It should be understood that these process steps are exemplary and there may be other steps well known in the art for forming the layers.

The shields and pole pieces are preferably Permalloy which is $Ni_{80}Fe_{20}$. If desired, a higher magnetic moment material may be employed for the second pole piece such as $Ni_{45}Fe_{55}$. The insulation layers of the insulation are preferably photoresist, except the first insulation layer and the planarizing layer which are preferably alumina ($Al_2O_3$). Because of the present inventions unique design of minimizing the shield layers, the amount of photoresist is also minimized. After each photoresist layer is patterned, it is hard baked, such as at a temperature of 200° C., which provides each layer with sloping surfaces at its edges. Optionally, the insulation layers may be another insulation material, such as alumina ($Al_2O_3$) or silicon dioxide ($SiO_2$). The write gap layer is preferably alumina and formed by sputtering. The pole piece layers are frame plated which comprises patterning with photoresist, plating into the opening in the photoresist and then removing the photoresist. If the pole piece layer is formed on a nonmagnetic layer, such as alumina or baked photoresist, a seedlayer, such as copper or Permalloy, is sputtered on the layer to provide a return path for electroplating. A copper seedlayer is employed before the frame plating of a coil layer, after which the seedlayer is removed by ion milling without any patterning. Accordingly, the ion milling step for removing the seedlayer, after frame plating a coil layer, ion mills all of the surfaces of the wafer upon which rows and columns of heads are normally constructed. A metallic layer is normally constructed by frame plating. Frame plating comprises sputtering a seedlayer on the underlying layer if the underlying layer is electrically non-conductive, spinning a photoresist layer on the underlying layer, light imaging the photoresist layer in areas that are to be opened, developing the exposed regions of the photoresist to provide openings, or an opening, exposing the seedlayer where a metallic layer is to be plated, plating the metallic layer by electroplating, stripping the photoresist layer with a solvent and removing any seedlayer by ion milling.

Figure 13A:
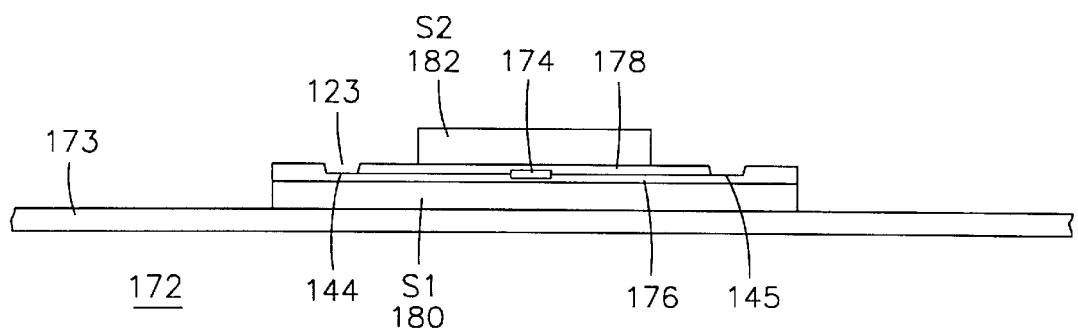
FIGS. 13A–13D illustrate some of the processing steps to planarized the surface at the second shield layer.
Figure 13B:
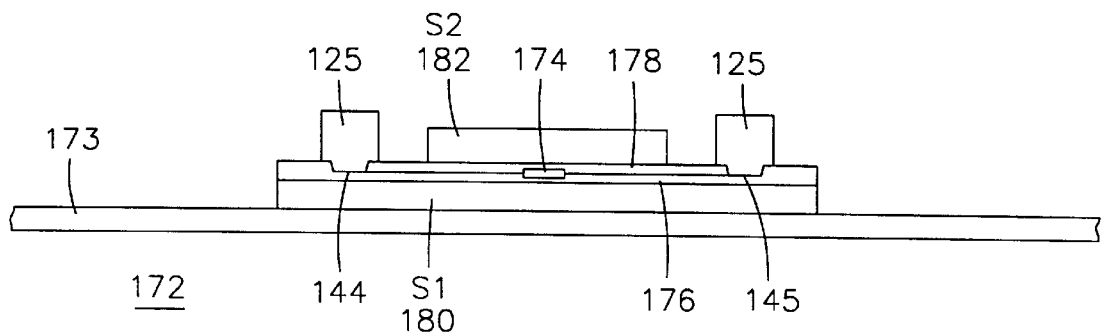
Figure 13C:
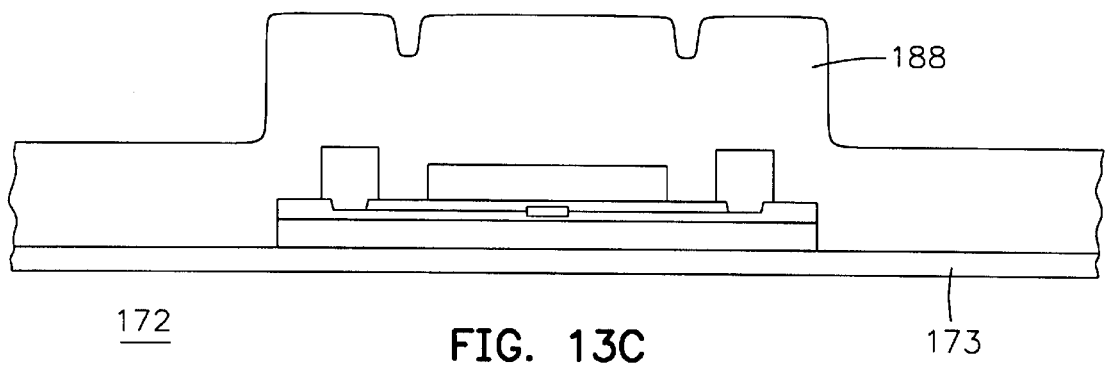
Figure 13D:
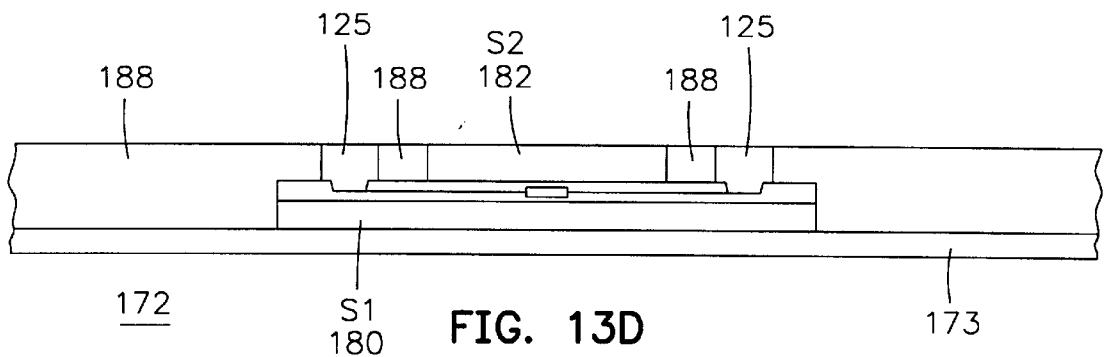

FIGS. 13A–13D illustrated a planarization process for the formation of a planarized surface at the S2 (second shield) layer. The first shield layer 180 is formed on a substrate 172. Optionally, a layer of undercoat 173 may be positioned between the first shield layer 180 and the substrate 172. The first shield layer 180 being sized to shield the MR sensor 174. A first gap layer 176 is formed on the first shield layer 180 by conventional means. The MR sensor 174 is then formed by subtractive etching or another suitable process, and sensor leads 144 and 145 are formed thereon by methods such as electroplating or sputtering. A second gap layer 178 is then formed over the sensor 174 and leads 144 and 145. The second shield layer 182 is formed over the second gap layer 178 completing the read portion 171 of the head 140. Vias 123 are opened to expose the sensor leads. Copper studs 125 are plated into the vias to a thickness greater than the height of the S2 (second shield 182) surface. To planarize the head at the S2 level, a planarizing layer 188 is applied. Planarizing layer 188 is preferably made from a electrically isolating material, such as $Al_2O_3$ and may be fabricated on a single layer (as shown in the figures) or may be separate layers. Once formed, the planarization layer 188 may be planarized by chemical mechanical polishing (CMP) or other suitable means of planarization to form a planar surface. Once planarized, as shown in FIG. 13D, the write portion 170 of the head 140, along with pads 121 and leads 120 are fabricated on the planar surface.

While the invention herein disclosed has been described by means of specific embodiments and applications thereof, numerous modifications and variations could be made thereto by those skilled in the art without departing from the scope of the invention set forth in the claims.

We claim:

1. A combined magnetic read and write head having a top, a bottom, a front and rear ends and an air bearing surface (ABS) at the front end, comprising:
   a substrate;
   first and second shield layers on the substrate, the second shield layer having a top surface;
   a read gap separating the first and second shield layers;
   a sensor layer with first and second sensor leads positioned in the read gap;
   a planarization layer on the substrate substantially surrounding the first and second shield layers, a top surface of the planarization layer being substantially coplanar with the top surface of the second shield layer and forming a planar surface;
   first and second pole pieces on the second shield layer;
   a write gap;
   the first and second pole pieces being separated by the write gap at the ABS and connected at a back gap that is recessed in the head from the ABS;
   at least one coil layer being located on the planar surface, a portion of the coil layer being located between the first and second pole pieces; and
   at least a first write lead and first and second read leads located on the planarization layer.

2. The combined head in claim 1 further comprising:
   first and second write pads on the planarization layer and said at least first write lead being connected to one of the first and second write pads; and
   first and second read pads on the planarization layer and connected to the first and second read leads respectively.

3. The combined head in claim 2 further comprising:
   at least a first write stud interconnecting the at a least first write lead to the write coil; and
   first and second read studs extending through the planarization layer for interconnecting the first and second read leads to the sensor.

4. The combined head in claim 1 further comprising:
   first and second write pads and first and second read pads on the planarization layer;
   a second write lead on the planarization layer with each of the first and second write leads having first and second ends wherein the first end of the first write lead is connected to the first write pad and the first end of the second write lead is connected to the second write pad;
   first and second read leads on the planarization layer and each read lead having first and second ends with the first end of the first read lead being connected to the first read pad and the first end of the second lead being connected to the second lead pad;
   a first write stud connecting the first write lead to the coil layer; and
   first and second read studs extending through the planarization layer for connecting the second ends of the first and second read leads to the sensor.

5. The combined head in claim 1 wherein the sensor layer is a magnetoresistive (MR) sensor.

6. The combined head in claim 1 wherein the read gap includes first and second read gap layers and the sensor layer is separated from the first and second shield layer by said first and second read gap layers.

7. The combined head in claim 1 wherein the at least one coil layer is embedded in an insulation layer, the insulation layer insulating the coil from said first and second pole pieces.

8. The combined head in claim 1 wherein the first pole piece layer and the second shield layer are a common layer.

9. The combined head in claim 1 further comprising:
   first and second read pads and first and second write pads formed in a predetermined arrangement on the planarization layer;
   the first write pad being electrically connected to an outer coil tap on the coil layer by the first write lead on the planar surface;
   the second write pad being electrically connected to an inner coil tap on the coil layer by an overpass lead; and
   the first and second read pads being electrically connected to the sensor leads by the first and second read leads on the planar surface.

10. The combined head in claim 9 wherein the first and second read pads and first and second write pads on the planarization layer are electrically connected to a plurality of terminal pads on a slider.

11. The combined head in claim 1 wherein first pole piece has a first width at the ABS and the second pole piece has a second width at the ABS with the first width being greater than the second width.

12. The combined head of claim 1 wherein the first pole piece and the second pole piece are made of the same material.

13. The combined head of claim 12 wherein the first and second pole pieces are made of $Ni_{80}Fe_{20}$.

14. The combined head of claim 1 wherein the first pole piece and the second pole piece are made of different materials.

15. The combined head of claim 14 wherein the first pole piece is made of $Ni_{80}Fe_{20}$ and the second pole piece is made of $Ni_{45}Fe_{55}$.

16. The combined head of claim 1 wherein the planarization layer is made of $Al_2O_3$.

17. A combined magnetic read and write head that has a top, a bottom, a front and rear ends and an air bearing surface (ABS) at said front end, comprising:
   a substrate;
   a first shield layer on the substrate;
   a first read gap layer on the first shield layer;
   a sensor layer and first and second sensor lead layers on the first read gap layer, the first and second sensor lead layers being connected to the sensor layer;
   a second read gap layer on the sensor layer and the first and second lead layers;
   a second shield layer on the second read gap layer, the second shield layer having a top surface;
   a planarization layer on the substrate substantially surrounding the second shield layer and having a top surface that is substantially coplanar with the top surface of the second shield layer so as to form a planar surface;
   an insulation layer with at least one coil layer embedded in the insulation layer on the planar surface;
   a pole piece formed over a portion of the insulation layer, the pole piece being separated by a write gap layer at the ABS and connected to the second shield layer at the back gap that is recessed in the head from the ABS and;
   first and second read leads located on the planarization layer and connected to said first and second sensor leads respectively.

18. The combined head in claim 17 further comprising:
first and second read pads and first and second write pads formed in a predetermined arrangement on the planarization layer;
the first write pad being electrically connected to an outer coil tap on the coil layer by a write lead on the planarization layer;
the second write pad being electrically connected to an inner coil tap on the coil layer by an overpass lead; and
the first and second read pads being electrically connected to first and second sensor leads by the first and second read leads.

19. The combined head in claim 18 wherein the electrical connection of the first and second read pads to the first and second sensor lead layers includes conductive vias in the planarization layer between the read leads and the sensor leads.

20. The combined head in claim 18 wherein the first and second read pads and first and second write pads on the planarization layer are electrically connected to a plurality of terminal pads on a slider.

21. The combined head in claim 17 wherein the sensor layer is a magnetoresistive sensor.

22. The combined head in claim 17 wherein the first shield layer is sized specially for the sensor layer.

23. The combined head in claim 17 wherein second shield layer has a first width at the ABS and the pole piece has a second width at the ABS with the first width being greater than the second width.

24. The combined head of claim 17 wherein the pole piece and the second shield are made of the same material.

25. The combined head of claim 24 wherein the pole piece and the second shield are made of $Ni_{80}Fe_{20}$.

26. The combined head of claim 17 wherein the pole piece and the second shield are made of different materials.

27. The combined head of claim 26 wherein the pole piece is made of $Ni_{45}Fe_{55}$ and the second shield is made of $Ni_{80}Fe_{20}$.

28. The combined head of claim 17 wherein the planarization layer is made of $Al_2O_3$.

29. The combined head of claim 17 wherein the insulation layers are made of a material selected from the group consisting of hard baked resist, $Al_2O_3$ and $SiO_2$.

30. A combined magnetic read and write head that has a top, a bottom, a front and rear ends and an air bearing surface (ABS) at said front end, comprising:
a substrate;
a first shield layer on the substrate;
a first read gap layer on the first shield layer;
a sensor layer and first and second sensor lead layers on the first read gap layer, the first and second sensor lead layers being connected to the sensor layer;
a second read gap layer on the sensor layer and the first and second sensor lead layers;
a second shield layer on the second read gap layer, the second shield layer having a top surface;
a planarization layer on the substrate substantially surrounding the second shield layer and having a top surface that is substantially coplanar with the top surface of the second shield layer so as to form a planar surface;
an insulation layer with at least one coil layer embedded in the insulation layer on the planar surface;
a pole piece formed over a portion of the insulation layer, the pole piece being separated by a write gap layer at the ABS and connected to the second shield layer at the back gap that is recessed in the head from the ABS;
first and second read leads located on the planarization layer and connected to said first and second sensor leads respectively;
a first write pad on the planarizing layer electrically connected to an outer coil tap on the coil layer by a first write lead on the planarization layer;
a second write pad on the planarizing layer electrically connected to an inner coil tap on the coil layer by a second write lead, the second write lead being an overpass lead;
a first read pad on the planarizing layer electrically connected to the first sensor lead layer by a first read lead on the planarization layer; and
a second read pad on the planarizing layer electrically connected to the second sensor lead layer by a second read lead on the planarization layer.

31. The combined head in claim 30 wherein the electrical connection of the first and second read pads to the first and second sensor lead layers includes conductive vias in the planarization layer extending between the first and second read leads and the first and second sensor leads.

32. The combined head in claim 30 wherein the first and second read pads and first and second write pads are electrically connected to a plurality of terminal pads on a slider.

33. The combined head in claim 30 wherein the sensor layer is a magnetoresistive sensor.

34. The combined head in claim 30 wherein the first shield layer is smaller than the coil layer.

35. The combined head in claim 30 wherein second shield layer has a first width at the ABS and the pole piece has a second width at the ABS with the first width being greater than the second width.

36. The combined head of claim 30 wherein the pole piece and the second shield are made of the same material.

37. The combined head of claim 36 wherein the pole piece and the second shield are made of $Ni_{80}Fe_{20}$.

38. The combined head of claim 30 wherein the pole piece and the second shield are made of different materials.

39. The combined head of claim 38 wherein the pole piece is made of $Ni_{45}Fe_{55}$ and the second shield is made of $Ni_{80}Fe_{20}$.

40. The combined head of claim 30 wherein the planarization layer is made of $Al_2O_3$.

41. The combined head of claim 30 wherein the insulation layers are made of a material selected from the group consisting of hard baked resist, $Al_2O_3$ and $SiO_2$.

42. A magnetic disk drive comprising:
a frame;
a magnetic disk rotatably supported on the frame;
a combined magnetic head;
a support mounted on the frame for supporting the combined magnetic head in a transducing relationship with the magnetic disk;
means for rotating the magnetic disk;
positioning means connected to the support for moving the combined magnetic head to multiple positions with respect to said magnetic disk;
means connected to the combined magnetic head, to the means for rotating the magnetic disk and to the positioning means for exchanging signals with the combined magnetic head, for controlling movement of the magnetic disk and for controlling the position of the combined magnetic head; and said combined magnetic head including a top, a bottom, a front and rear ends and an air bearing surface (ABS) at said front end, the combined magnetic head further including:
a substrate,
a first shield layer on the substrate;
a first read gap layer on the first shield layer;
a sensor layer and first and second sensor lead layers on the first read gap layer, the first and second sensor lead layers being connected to the sensor layer;
a second read gap layer on the sensor layer and the first and second lead layers;
a second shield layer on the second read gap layer, the second shield layer having a top surface;
a planarization layer on the substrate substantially surrounding the second shield layer and having a top surface that is substantially coplanar with the top surface of the second shield layer so as to form a planar surface;
an insulation layer with at least one coil layer embedded in the insulation layer on the planar surface;
a pole piece formed over a portion of the insulation layer, the pole piece being separated by a write gap layer at the ABS and connected to the second shield layer at the back gap that is recessed in the head from the ABS and;
first and second read leads located on the planarization layer and connected to said first and second sensor leads respectively.

43. The combined head in claim 42 further comprising:
first and second read pads and first and second write pads formed in a predetermined arrangement on the planarization layer;
the first write pad being electrically connected to an outer coil tap on the coil layer by a write lead on the planarization layer;
the second write pad being electrically connected to an inner coil tap on the coil layer by an overpass lead; and
the first and second read pads being electrically connected to first and second sensor leads by the first and second read leads.

44. The combined head in claim 43 wherein the electrical connection of the first and second read pads to the first and second sensor lead layers includes conductive vias in the planarization layer between the read leads and the first and second sensor leads.

45. The combined head in claim 43 wherein the first and second read pads and first and second write pads on the planarization layer are electrically connected to a plurality of terminal pads on a slider.

46. The combined head in claim 42 wherein the sensor layer is a magnetoresistive sensor.

47. The combined head in claim 42 wherein the first shield layer is smaller than the coil layer.

48. The combined head in claim 42 wherein second shield layer has a first width at the ABS and the pole piece has a second width at the ABS with the first width being greater than the second width.

49. The combined head of claim 42 wherein the pole piece and the second shield are made of the same material.

50. The combined head of claim 49 wherein the pole piece and the second shield are made of $Ni_{80}Fe_{20}$.

51. The combined head of claim 42 wherein the pole piece and the second shield are made of different materials.

52. The combined head of claim 51 wherein the pole piece is made of $Ni_{45}Fe_{55}$ and the second shield is made of $Ni_{80}Fe_{20}$.

53. The combined head of claim 42 wherein the planarization layer is made of $Al_2O_3$.

54. The combined head of claim 42 wherein the insulation layers are made of a material selected from the group consisting of hard baked resist, $Al_2O_3$ and $SiO_2$.

55. A magnetic disk drive comprising:
a frame;
a magnetic disk rotatably supported on the frame;
a combined magnetic head;
a support mounted on the frame for supporting the combined magnetic head in a transducing relationship with the magnetic disk;
means for rotating the magnetic disk;
positioning means connected to the support for moving the combined magnetic head to multiple positions with respect to said magnetic disk;
means connected to the combined magnetic head, to the means for rotating the magnetic disk and to the positioning means for exchanging signals with the combined magnetic head, for controlling movement of the magnetic disk and for controlling the position of the combined magnetic head; and
said combined magnetic head including a top, a bottom, a front and rear ends and an air bearing surface (ABS) at said front end, the combined magnetic head further including:
a substrate;
a first shield layer on the substrate;
a first read gap layer on the first shield layer;
a sensor layer and first and second sensor lead layers on the first read gap layer, the first and second sensor lead layers being connected to the sensor layer;
a second read gap layer on the sensor layer and the first and second sensor lead layers;
a second shield layer on the second read gap layer, the second shield layer having a top surface;
a planarization layer on the substrate substantially surrounding the second shield layer and having a top surface that is substantially coplanar with the top surface of the second shield layer so as to form a planar surface;
an insulation layer with at least one coil layer embedded in the insulation layer on the planar surface;
a pole piece formed over a portion of the insulation layer, the pole piece being separated by a write gap layer at the ABS and connected to the second shield layer at the back gap that is recessed in the head from the ABS;
first and second read leads located on the planarization layer and connected to said first and second sensor leads respectively;
a first write pad on the planarizing layer electrically connected to an outer coil tap on the coil layer by a first write lead on the planarization layer;
a second write pad on the planarizing layer electrically connected to an inner coil tap on the coil layer by a second write lead, the second write lead being an overpass lead;
a first read pad on the planarizing layer electrically connected to the first sensor lead layer by a first read lead on the planarization layer; and
a second read pad on the planarizing layer electrically connected to the second sensor lead layer by a second read lead on the planarization layer.

56. The combined head in claim 55 wherein the electrical connection of the first and second read pads to the first and second sensor lead layers includes conductive vias in the planarization layer extending between the first and second read leads and the first and second sensor leads.

57. The combined head in claim 55 wherein the first and second read pads and first and second write pads are electrically connected to a plurality of terminal pads on a slider.

58. The combined head in claim 55 wherein the sensor layer is a magnetoresistive sensor.

59. The combined head in claim 55 wherein the first shield layer is smaller than the coil layer.

60. The combined head in claim 55 wherein second shield layer has a first width at the ABS and the pole piece has a second width at the ABS with the first width being greater than the second width.

61. The combined head of claim 55 wherein the pole piece and the second shield are made of the same material.

62. The combined head of claim 61 wherein the pole piece and the second shield are made of $Ni_{80}Fe_{20}$.

63. The combined head of claim 55 wherein the pole piece and the second shield are made of different materials.

64. The combined head of claim 63 wherein the pole piece is made of $Ni_{45}Fe_{55}$ and the second shield is made of $Ni_{80}Fe_{20}$.

65. The combined head of claim 55 wherein the planarization layer is made of $Al_2O_3$.

66. The combined head of claim 55 wherein the insulation layers are made of a material selected from the group consisting of hard baked resist, $Al_2O_3$ and $SiO_2$.

67. A method of making a combined magnetic read and write head having a top, a bottom, a front and rear ends and an air bearing surface (ABS) at said front end, comprising the steps of:

providing a substrate;

forming a first shield layer on the substrate;

forming a first read gap layer on the first shield layer;

forming a sensor layer and first and second sensor lead layers on the first read gap layer;

connecting the first and second sensor lead layers to the sensor layer;

forming a second read gap layer on the sensor layer, covering the sensor layer and first and second lead layers;

forming a second shield layer on the second read gap layer, the second shield layer having a top surface;

forming a planarization layer on the substrate substantially surrounding the second shield layer with a top surface that is substantially coplanar with the top surface of the second shield layer so as to form a planar surface;

forming an insulation layer with at least one coil layer embedded in the insulation layer on the planar surface;

forming a pole piece over a portion of the insulation layer with the pole piece being separated by a write gap layer at the ABS and connected to the second shield layer at the back gap which is recessed in the head from the ABS; and forming first and second read leads located on the planarization layer and connected to said first and second sensor leads respectively.

68. The method as claimed in claim 67 further comprising:

forming first and second read pads and first and second write pads in a predetermined arrangement on the planarization layer;

electrically connecting the first write pad to an outer coil tap on the coil layer by a first write lead on the planarization layer;

electrically connecting the second write pad to an inner coil tap on the coil layer by an overpass lead;

electrically connecting the first read pad to the first sensor lead layer by a first read lead on the planarization layer; and electrically connecting the second read pad to the second sensor lead layer by a second read lead on the planarization layer.

69. The method as claimed in claim 68 wherein the electrically connecting the first and second read pads to the first and second sensor lead layers includes conductive vias in the planarization layer between the first and second read leads and the first and second sensor leads.

70. The method as claimed in claim 68 wherein the first and second read pads and first and second write pads on the planarization layer are electrically connected to a plurality of terminal pads on a slider.

71. The method as claimed in claim 67 wherein the sensor layer is a magnetoresistive sensor.

72. The method as claimed in claim 67 wherein the first shield layer is smaller than the coil layer.

73. The method as claimed in claim 67 wherein the second shield layer has a first width at the ABS and the pole piece has a second width at the ABS with the first width being greater than the second width.

74. The method as claimed in claim 67 wherein the pole piece and the second shield are made of the same material.

75. The method as claimed in claim 74 wherein the pole piece and the second shield are made of $Ni_{80}Fe_{20}$.

76. The method as claimed in claim 67 wherein the pole piece and the second shield are made of different materials.

77. The method as claimed in claim 76 wherein the pole piece is made of $Ni_{45}Fe_{55}$ and the second shield is made of $Ni_{80}Fe_{20}$.

78. The method as claimed in claim 67 wherein the planarization layer is made of $Al_2O_3$.

79. The method as claimed in claim 67 wherein the insulation layers are made of a material selected from the group consisting of hard baked resist, $Al_2O_3$ and $SiO_2$.

80. A method of making a combined magnetic read and write head having a top, a bottom, a front and rear ends and an air bearing surface (ABS) at said front end, comprising the steps of:

providing a substrate;

forming a first shield layer on the substrate;

forming a first read gap layer on the first shield layer;

forming a sensor layer and first and second sensor lead layers on the first read gap layer;

connecting the first and second sensor lead layers to the sensor layer;

forming a second read gap layer on the sensor layer, covering the sensor layer and first and second lead layers;

forming a second shield layer on the second read gap layer, the second shield layer having a top surface;

forming a planarization layer on the substrate substantially surrounding the second shield layer and having a top surface that is substantially coplanar with the top surface of the second shield layer so as to form a planar surface;

forming an insulation layer with at least one coil layer embedded in the insulation layer on the planar surface;

forming a pole piece over a portion of the insulation layer with the pole piece being separated by a write gap layer at the ABS and connected to the second shield layer at the back gap which is recessed in the head from the ABS;

forming first and second read leads on the planarization layer and connected to said first and second sensor leads respectively;

forming first and second read pads and first and second write pads in a predetermined arrangement on the planarization layer;

electrically connecting the first write pad to an outer coil tap on the coil layer by a first write lead on the planarization layer;

electrically connecting the second write pad to an inner coil tap on the coil layer by an overpass lead;

electrically connecting the first read pad to the first sensor lead layer by a first read lead on the planarization layer; and electrically connecting the second read pad to the second sensor lead layer by a second read lead on the planarization layer.

81. The method as claimed in claim 80 wherein the electrically connecting the first and second read pads to the first and second sensor lead layers includes conductive vias in the planarization layer between the first and second read leads and the first and second sensor leads.

82. The method as claimed in claim 80 wherein the first and second read pads and first and second write pads on the planarization layer are electrically connected to a plurality of terminal pads on a slider.

83. The method as claimed in claim 80 wherein the sensor layer is a magnetoresistive sensor.

84. The method as claimed in claim 80 wherein the first shield layer is smaller than the coil layer.

85. The method as claimed in claim 80 wherein the second shield layer has a first width at the ABS and the pole piece has a second width at the ABS with the first width being greater than the second width.

86. The method as claimed in claim 80 wherein the pole piece and the second shield are made of the same material.

87. The method as claimed in claim 86 wherein the pole piece and the second shield are made of $Ni_{80}Fe_{20}$.

88. The method as claimed in claim 80 wherein the pole piece and the second shield are made of different materials.

89. The method as claimed in claim 88 wherein the pole piece is made of $Ni_{45}Fe_{55}$ and the second shield is made of $Ni_{80}Fe_{20}$.

90. The method as claimed in claim 80 wherein the planarization layer is made of $Al_2O_3$.

91. The method as claimed in claim 80 wherein the insulation layers are made of a material selected from the group consisting of hard baked resist, $Al_2O_3$ and $SiO_2$.

92. A magnetic head assembly having top, bottom, front and rear ends with the front end forming a portion of an air bearing surface (ABS), comprising:

ferromagnetic first and second shield layers;

insulative first and second read gap layers located between the first and second shield layers;

a read sensor and first and second lower read leads connected to the read sensor;

the read sensor and the first and second lower read leads being located between the first and second read gap layers;

the second shield layer being partially bounded by a top surface;

an insulative planarizing layer having a top surface that is coplanar with the top surface of the second shield layer;

first and second upper read leads located on the planarizing layer; and first and second connecting means connecting the first and second lower read leads to the first and second upper read leads respectively.

93. A magnetic head assembly as claimed in claim 92 including:

a ferromagnetic second pole piece layer;

a write gap layer located between the second pole piece layer and the second shield layer at the ABS;

a write coil layer recessed from the ABS and located between the planarizing layer and the second pole piece layer;

a first write coil lead connected to an inner end of the write coil and a second write coil lead connected to the first write coil lead; and the second write coil lead being located on the planarizing layer and being coplanar with said first and second upper read leads.

94. A magnetic head assembly as claimed in claim 93 including:

the write gap layer further being located between the planarizing layer and the first and second upper read leads; and the first and second connecting means being conductive first and second studs which extend through the planarizing layer.

95. A magnetic head assembly as claimed in claim 93 including:

a third write coil lead connected to an outer end of the write coil and a fourth write coil lead connected to the third write coil lead;

the fourth write coil lead being located on the planarizing layer and being coplanar with the second write coil lead and the first and second upper read leads;

conductive first, second, third and fourth pads located on the planarizing layer and connected to the first and second upper read leads and the second and fourth write coil leads respectively; and the first, second, third and fourth pads being coplanar with the first and second upper read leads and the second and fourth write coil leads.

96. A magnetic head assembly as claimed in claim 95 including:

the write gap layer further being located between the planarizing layer and the first and second upper read leads; and the first and second connecting means being conductive first and second studs which extend through the planarizing layer.

97. A magnetic head assembly as claimed in claim 96 wherein each of the first and second studs has a top surface which is coplanar with said planarizing layer.

98. A magnetic disk drive comprising:

a frame;

a magnetic disk rotatably supported on the frame;

a combined magnetic head;

a support mounted on the frame for supporting the combined magnetic head in a transducing relationship with the magnetic disk;

means for rotating the magnetic disk;

positioning means connected to the support for moving the combined magnetic head to multiple positions with respect to said magnetic disk;

means connected to the combined magnetic head, to the means for rotating the magnetic disk and to the positioning means for exchanging signals with the combined magnetic head, for controlling movement of the magnetic disk and for controlling the position of the combined magnetic head; and said combined magnetic head including a top, a bottom, a front and rear ends and an air bearing surface (ABS) at said front end, the combined magnetic head further including:

ferromagnetic first and second shield layers;

insulative first and second read gap layers located between the first and second shield layers;

a read sensor and first and second lower read leads connected to the read sensor;

the read sensor and the first and second lower read leads being located between the first and second read gap layers, the second shield layer being partially bounded by a top surface;

an insulative planarizing layer having a top surface that is coplanar with the top surface of the second shield layer;

first and second upper read leads located on the planarizing layer; and first and second connecting means connecting the first and second lower read leads to the first and second upper read leads respectively.

99. A magnetic disk drive as claimed in claim 98 including:

a ferromagnetic second pole piece layer;

a write gap layer located between the second pole piece layer and the second shield layer at the ABS;

a write coil layer recessed from the ABS and located between the planarizing layer and the second pole piece layer;

a first write coil lead connected to an inner end of the write coil and a second write coil lead connected to the first write coil lead; and the second write coil lead being located on the planarizing layer and being coplanar with said first and second upper read leads.

100. A magnetic disk drive as claimed in claim 99 including:

the write gap layer further being located between the planarizing layer and the first and second upper read leads; and the first and second connecting means being conductive first and second studs which extend through the planarizing layer.

101. A magnetic disk drive as claimed in claim 99 including:

a third write coil lead connected to an outer end of the write coil and a fourth write coil lead connected to the third write coil lead;

the fourth write coil lead being located on the planarizing layer and being coplanar with the second write coil lead and the first and second upper read leads;

conductive first, second, third and fourth pads located on the planarizing layer and connected to the first and second upper read leads and the second and fourth write coil leads respectively; and the first, second, third and fourth pads being coplanar with the first and second upper read leads and the second and fourth write coil leads.

102. A magnetic disk drive as claimed in claim 101 including:

the write gap layer further being located between the planarizing layer and the first and second upper read leads; and the first and second connecting means being conductive first and second studs which extend through the planarizing layer.

103. A magnetic disk drive as claimed in claim 102 wherein each of the first and second studs has a top surface which is coplanar with said planarizing layer.

104. A method of making a magnetic head assembly having top, bottom, front and rear ends with the front end forming a portion of an air bearing surface (ABS), comprising the steps of:

forming ferromagnetic first and second shield layers;

forming insulative first and second read gap layers between the first and second shield layers;

forming a read sensor and first and second lower read leads connected to the read sensor with the read sensor and the first and second lower read leads being located between the first and second read gap layers;

the second shield layer being formed with a top surface;

forming an insulative planarizing layer with a top surface that is coplanar with the top surface of the second shield layer;

forming first and second upper read leads on the planarizing layer; and forming first and second connecting means that connect the first and second lower read leads to the first and second upper read leads respectively.

105. A method as claimed in claim 104 including the steps of:

forming a ferromagnetic second pole piece layer;

forming a write gap layer between the second pole piece layer and the second shield layer at the ABS;

forming a write coil layer recessed from the ABS and between the planarizing layer and the second pole piece layer;

forming a first write coil lead connected to an inner end of the write coil and a second write coil lead connected to the first write coil lead; and forming the second write coil lead on the planarizing layer and coplanar with said first and second upper read leads.

106. A method as claimed in claim 105 including the steps of:

the write gap layer further being further formed between the planarizing layer and the first and second upper read leads; and the first and second connecting means being formed of conductive first and second studs which extend through the planarizing layer.

107. A method as claimed in claim 105 including the steps of:

forming a third write coil lead connected to an outer end of the write coil and a fourth write coil lead connected to the third write coil lead;

forming the fourth write coil lead on the planarizing layer and coplanar with the second write coil lead and the first and second upper read leads;

forming conductive first, second, third and fourth pads on the planarizing layer and connected to the first and second upper read leads and the second and fourth write coil leads respectively; and forming the first, second, third and fourth pads coplanar with the first and second upper read leads and the second and fourth write coil leads.

108. A method as claimed in claim 107 including the steps of:

the write gap layer further being further formed between the planarizing layer and the first and second upper read leads; and the first and second connecting means being formed of conductive first and second studs which extend through the planarizing layer.

109. A method as claimed in claim 108 wherein each of the first and second studs is formed with a top surface which is coplanar with the planarizing layer.

* * * * *